(12) United States Patent
Lee et al.

(10) Patent No.: US 10,078,426 B2
(45) Date of Patent: Sep. 18, 2018

(54) ELECTRONIC APPARATUS, METHOD FOR EXECUTING APPLICATION, AND COMPUTER-READABLE RECORDING MEDIUM

(71) Applicant: Samsung Electronics Co., Ltd., Gyeonggi-do (KR)

(72) Inventors: Hyeon-mi Lee, Gyeonggi-do (KR); Min Jang, Gyeonggi-do (KR); Woo-jin Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/649,092

(22) Filed: Jul. 13, 2017

(65) Prior Publication Data

US 2017/0308252 A1    Oct. 26, 2017

Related U.S. Application Data

(63) Continuation of application No. 14/469,329, filed on Aug. 26, 2014, now Pat. No. 9,733,798.

(30) Foreign Application Priority Data

Oct. 16, 2013 (KR) .......................... 10-2013-0123661

(51) Int. Cl.
*G06F 3/048*  (2013.01)
*G06F 3/0482* (2013.01)
(Continued)

(52) U.S. Cl.
CPC .......... *G06F 3/0482* (2013.01); *G06F 3/0486* (2013.01); *G06F 3/04817* (2013.01); *G06F 3/04842* (2013.01); *G06F 8/61* (2013.01)

(58) Field of Classification Search
CPC ............................................. G06F 2203/04803
See application file for complete search history.

(56) References Cited

U.S. PATENT DOCUMENTS

| 2007/0082707 A1* | 4/2007 | Flynt | G06F 3/0481 |
| | | | 455/564 |
| 2010/0138780 A1* | 6/2010 | Marano | G06F 3/1415 |
| | | | 715/804 |

(Continued)

*Primary Examiner* — Claudia Dragoescu
(74) *Attorney, Agent, or Firm* — The Farrell Law Firm, P.C.

(57) ABSTRACT

A portable electronic device is provided. The portable electronic device includes a display, a memory to store a first set of applications and a second set of applications, the first set of applications and the second set of applications to be executed in a first operation mode and a second operation mode of a same operating system, respectively, and a processor. The processor is adapted to display a background screen and a first icon via the display, at least temporarily, while the portable electronic device is operated in the first operation mode, identify a first input received with respect to the first icon, display one or more rectangular indications on a first portion of the background screen based at least in part on the first input, each of the one or more rectangular indications indicative of an application of one or more of the second set of applications, identify a dragging input received with respect to a rectangular indication selected from the one or more rectangular indications, display a second icon corresponding to a respective application of the one or more of the second set of applications indicated by the selected rectangular indication on a second portion of the background screen where the dragging input is released, and execute the respective application based at least in part on a second input received with respect to the second icon.

20 Claims, 18 Drawing Sheets

(51) Int. Cl.
*G06F 3/0481* (2013.01)
*G06F 3/0484* (2013.01)
*G06F 3/0486* (2013.01)
*G06F 8/61* (2018.01)

(56) References Cited

U.S. PATENT DOCUMENTS

| | | | |
|---|---|---|---|
| 2011/0296418 A1* | 12/2011 | Kim | G06F 11/328 |
| | | | 718/100 |
| 2012/0089992 A1* | 4/2012 | Reeves | G06F 3/1431 |
| | | | 719/318 |
| 2012/0151368 A1 | 6/2012 | Tam | |
| 2012/0240056 A1* | 9/2012 | Webber | G06Q 10/107 |
| | | | 715/752 |
| 2012/0329441 A1* | 12/2012 | Tseng | G01C 21/265 |
| | | | 455/418 |
| 2013/0167065 A1* | 6/2013 | Chen | G06F 3/0488 |
| | | | 715/777 |
| 2013/0326391 A1 | 12/2013 | Chen | |

* cited by examiner

ELECTRONIC APPARATUS, METHOD FOR EXECUTING APPLICATION, AND COMPUTER-READABLE RECORDING MEDIUM

PRIORITY

This application is a Continuation application of, and claims priority under 35 U.S.C. § 120 to, U.S. patent application Ser. No. 14/469,329 filed in the U.S. Patent and Trademark Office on Aug. 26, 2014, which claims priority under 35 U.S.C. § 119(a) to a Korean Patent Application filed on Oct. 16, 2013, in the Korean Intellectual Property Office and assigned Serial No. 10-2013-0123661, the entire contents of each of which are incorporated herein by reference.

BACKGROUND

1. Field of the Invention

The present invention relates generally to apparatuses and methods consistent with embodiments related to an electronic apparatus, an application execution method, and a computer-readable recording medium, and more particularly, to an electronic apparatus capable of easily selecting a windows store application in a desktop mode and operating the selected windows store application, an application execution method, and a computer-readable recording medium.

2. Description of the Related Art

A computer is a machine which is implemented with logical languages and processes a series of computations, and includes an Operating System (OS) for efficiently operating a hardware system.

A recent OS provides a plurality of operating environments on one OS to provide convenience of an operation in the desktop environment and the mobile environment. Specifically, the recent OS supports the desktop mode such as an existing Personal Computer (PC) environment as well as a touch screen-based modern User Interface (UI) (or a metro mode, a modern mode, or the like) provided from a prior version of a mobile phone, or the like. Thus, applications executed in the desktop mode and applications executed in the modern UI are mixed and installed in the recent operating system.

However, such an OS does not provide a list for the installed applications in the desktop mode, and provides the list only in the modern UI. In general, the desktop mode rather than the modern UI is used in the work environment such as at companies, and an application (that is, windows store application or metro application) operating in the metro mode may be easily selected in the desktop mode without using the modern UI.

However, the OS may select an application operating in the metro mode only in the metro mode, and may not select or operate the application operating in the metro mode in the desktop mode.

SUMMARY

The present invention has been made to address the above-mentioned problems and disadvantages, and to provide at least the advantages described below.

Accordingly, an aspect of the present invention provides an electronic apparatus and a method for executing an application in an electronic apparatus having a first operation mode in which a desktop application is operated, and a second operation mode in which a windows store application is operated.

In accordance with an aspect of the present invention, a portable electronic device is provided. The portable electronic device includes a display, a memory to store a first set of applications and a second set of applications, the first set of applications and the second set of applications to be executed in a first operation mode and a second operation mode of a same operating system, respectively, and a processor. The processor is adapted to display a background screen and a first icon via the display, at least temporarily, while the portable electronic device is operated in the first operation mode, identify a first input received with respect to the first icon, display one or more rectangular indications on a first portion of the background screen based at least in part on the first input, each of the one or more rectangular indications indicative of an application of one or more of the second set of applications, identify a dragging input received with respect to a rectangular indication selected from the one or more rectangular indications, display a second icon corresponding to a respective application of the one or more of the second set of applications indicated by the selected rectangular indication on a second portion of the background screen where the dragging input is released, and execute the respective application based at least in part on a second input received with respect to the second icon.

In accordance with another aspect of the present invention, a portable electronic device is provided. The portable electronic device includes a display, a memory to store a first set of applications and a second set of applications, the first set of applications and the second set of applications to be executed in a first operation mode and a second operation mode of a same operating system, respectively, and a processor. The processor is adapted to display a background screen and a first icon via the display, at least temporarily, while the portable electronic device is operated in the first operation mode, identify a first input received with respect to the first icon, display one or more rectangular indications on a first portion of the background screen based at least in part on the first input, each of the one or more rectangular indications indicative of an application of one or more of the second set of applications, identify a dragging input received with respect to a rectangular indication selected from the one or more rectangular indications, display a second icon corresponding to a respective application of the one or more of the second set of applications indicated by the selected rectangular indication on a second portion of the background screen based at least in part on the dragging input being released, and execute the respective application based at least in part on a second input received with respect to the second icon.

In accordance with another aspect of the present invention, a non-transitory, machine-readable, storage device storing instructions thereon is provided. The instructions, when executed by one or more processors, cause the one or more processors to perform operations including storing, at a portable electronic device, a first set of applications and a second set of applications, the first set of applications and the second set of applications to be executed in a first operation mode and a second operation mode of a same operating system, respectively, displaying, via a display operatively coupled with the portable electronic device, a background screen and a first icon at least temporarily while the portable electronic device is operated in the first operation mode, identifying a first input received with respect to the first icon, displaying one or more rectangular indications on a first portion of the background screen based at least in part on the first input, each of the one or more rectangular indications indicative of an application of one or more of the second set of applications, identifying a dragging input received with respect to a rectangular indication selected from the one or more rectangular indications, displaying a second icon corresponding to a respective application of the one or more of the second set of applications indicated by the selected rectangular indication on a second portion of the background screen based at least in part on the dragging input being released, and executing the respective application based at least in part on a second input received with respect to the second icon.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
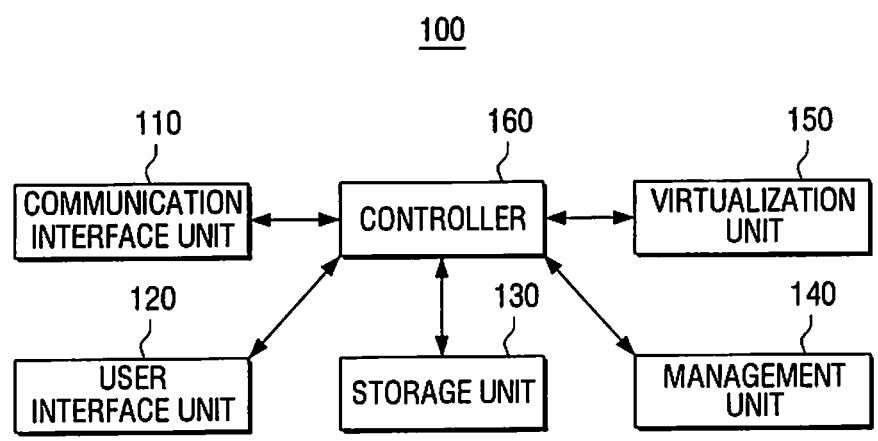
FIG. 1 is a view illustrating a configuration of an electronic apparatus according to an embodiment of the present invention.

Hereinafter, embodiments of the present invention are described in detail with reference to the accompanying drawings.

In the following description, same reference numerals are used for the same elements when they are depicted in different drawings. The matters defined in the description, such as detailed construction and elements, are provided to assist in a comprehensive understanding of the embodiments of the present invention. Thus, it is apparent that the embodiments of the present invention can be carried out without those specifically defined matters. Also, functions or elements known in the related art are not described in detail since they would obscure the embodiments of the present invention with unnecessary detail.

FIG. 1 is a view illustrating a configuration of an electronic apparatus according to an embodiment of the present invention.

Referring to FIG. 1, an electronic device 100 according to an embodiment of the present invention includes a communication interface unit 110, a user interface unit 120, a storage unit 130, a management unit 140, a virtualization unit 150, and the controller 160. The electronic device 100 may be an apparatus in which an Operating System (OS), which has a first operation mode (or a desktop mode) in which a desktop application is operated, and a second operation mode (or a modern UI, a metro mode, a modern mode, or the like) in which a windows store application (or a metro application) is operated, may be driven by, for example, a Personal Computer (PC), a laptop PC, a tablet PC, a Portable Multimedia Player (PMP), a portable phone, or the like. The OS may be, for example, Windows 8™ or Windows 8.1™.

The desktop application is an application which operates in a state such as prior versions of the PC environment (that is, suitable for an input environment based on a keyboard and mouse, and the windows store application is an application which operates in a state such as a mobile phone environment (that is, suitable for an input environment based on a touch screen).

The communication interface unit 110 connects the electronic apparatus 100 to an external apparatus (not shown). The communication interface unit 110 may be connected to the external apparatus through a Local Area Network (LAN) or an Internet network or may be connected to the external apparatus in a wireless communication (for example, wireless communication such as Global System for Mobile communication (GSM), Universal Mobile Telecommunications System (UMTS), Long Term Evolution (LTE), or Wireless Broadband Internet (WiBro) manner.

The communication interface unit 110 receives an application from an external apparatus. The received application is installed in the electronic apparatus 100 by the controller 160, and the application is stored in a preset folder of the storage unit 130.

The user interface unit 120 includes a plurality of function keys configured to allow various types of functions supported by the electronic apparatus 100 to be set or selected by a user, and displays various pieces of information provided in the electronic apparatus 100. The user interface unit 120 may be implemented with a device in which an input and output are simultaneously implemented, such as a touch screen. Further, the user interface unit 120 may include a touch screen and simultaneously further include a mouse (or a touch pad) and a monitor.

The user interface unit 120 displays a list for applications installed in the electronic apparatus 100. Specifically, the user interface unit 120 displays a list for desktop applications and windows store applications installed in the electronic apparatus 100 in the second operation mode. The user interface unit 120 displays the list with a tile icon (e.g. an icon having a rectangular shape) for a corresponding application. The user interface unit 120 displays the desktop application and the windows store application in a mixed manner or a divided manner.

A list in the second operation mode is displayed in response to entering a starting screen (or a metro start menu) of the second operation mode. Alternatively, the list in the second operation mode may be displayed in response to an icon arranged on a charm bar being selected or in response to an icon for indicating a list displayed in a preset location of the starting screen of the second operation mode being selected. The charm bar is a hidden menu region displayed in response to a right side of the screen being selected.

The user interface unit 120 displays a list for desktop applications and windows store applications installed in the electronic apparatus 100 in the first operation mode. The user interface unit 120 may display an icon for a corresponding application. The user interface unit 120 may display the desktop application and the windows store application in a mixed manner with division or a divided manner. Alternatively, the user interface unit 120 may display only the desktop application or only the windows store application. The user interface unit 120 may arrange and display applications based on frequency of use, an installed order, or a name of the application.

A list in the first operation mode may be displayed in response to an icon (e.g. an icon configured to receive a command for allowing the application list to be displayed) arranged on a charm bar being selected, in response to a specific gesture being input on a touch screen, or in response to a preset shortcut key being input.

The user interface unit 120 receives a selection for a windows store application to be displayed in response to entering the first operation mode. Specifically, in response to entering the first operation mode (that is, in a state in which a wallpaper of the desktop mode is displayed), the user interface unit 120 receives the selection for the windows store application to be displayed on a user interface window which displays information of the windows store application among a plurality of pre-stored applications. The selection may be performed in the first operation mode or in the second operation mode, and the selection operation is described below with reference to FIGS. 8 to 10.

Referring to FIG. 1, in response to entering the first operation mode, the user interface unit 120 displays an icon corresponding to the windows store application included in the list. Specifically, in response to a wallpaper of the desktop mode being displayed by the electronic apparatus 100, the electronic apparatus 100 displays the icon of the windows store application included in the list on the wallpaper. The icon is used to receive an operation command for a corresponding windows store application. Therefore, the user may easily perform selection and operation for the windows store application in the desktop mode.

The user interface unit 120 receives the selection for the displayed icon. Specifically, the user interface unit 120 receives an operation command for the displayed icon. The user interface unit 120 may also select an operation environment of the selected icon. For example, the user interface unit may select instead of a general operation environment (for example, an operation environment in the second operation) an operation environment in the desktop mode with respect to the windows store application.

The operation command for the windows store application in the desktop mode may be received in various forms. For example, in response to an icon displayed on the wallpaper of the desktop mode being first selected, and then the desktop mode being selected as an operation environment, the receiving of the operation command may be performed in response to an icon displayed in a start menu of a modern UI being placed on an icon for "execute in desktop mode" through a drag and drop manner, or in response to the icon displayed in the start menu of the modern UI being placed on an icon for entering of the first operation mode through a drag and drop manner.

The user interface unit 120 displays an operation screen of the application corresponding to the selected icon. In response to a plurality of applications being operated, the user interface unit 120 displays screens of the plurality of applications in a split-screen form or in a plurality of widget windows.

The storage unit 130 stores a program for driving the electronic apparatus 100. Specifically, the storage unit 130 stores a program which is a set of various commands required to drive the electronic apparatus 100. The program includes an OS and various types of applications. Specifically, the OS is an operating program for driving the electronic apparatus 100, and has a first operation mode in which a desktop application is operated, and a second operation mode in which a windows store application is operated.

The storage unit 130 stores a list. Specifically, the storage unit 130 stores a list managed by the management unit 140 described below. The list lists a windows store application to be displayed in a wallpaper of the first operation mode. The list may include address information for an execution file of the windows store application and icon information corresponding to the windows store application. Independently of the above-described list, the storage unit 130 may be implemented to store a modern list for the windows store application among the plurality of applications stored in the storage unit 130, or a desktop list for the desktop application among the plurality of applications. The storage unit 130 stores various types of icons.

The storage unit 130 may be implemented with a storage medium within the electronic apparatus 100, and an external storage medium, for example, a Universal Serial Bus (USB) memory, a removable disk including a flash memory or the like, a storage medium connected to an imaging apparatus, or a web server through a network.

The management unit 140 manages a list for a windows store application to be displayed in response to entering the first operation mode among the plurality of applications stored in the storage unit 130. Specifically, the management unit 140 manages applications to be displayed in response to entering the first operation mode (that is, application icons to be displayed on a wallpaper of the desktop mode). This embodiment of the present invention discloses that only windows store applications are included in the list, but it is obvious that icons of desktop applications may be displayed on the wallpaper of the desktop mode, and thus desktop applications may be included in the list.

The management unit 140 adds or deletes applications according to selection of the user. Specifically, the management unit 140 displays a user interface unit 120 in such a manner that information of the windows store application among the plurality of pre-stored applications is displayed in response to a list addition command being received from the user, or in response to a list display command of the windows store application being received from the user, and adds a selected windows store application to the list in response to the windows store application being selected on the displayed screen. The selection may be performed in a state of the first operation mode or in a state of the second operation mode, and the selection operation is described in detail below with reference to FIGS. 8 to 10.

The management unit 140 manages a modern list for the windows store application among the plurality of applications stored in the storage unit 130. Specifically, the management unit 140 determines whether each of the plurality of applications stored in the storage unit 130 is a desktop application or a windows store application. More specifically, an installation location of the desktop application (for example, %programdata%\Microsoft\windows\Start Menu folder) is different from an installation location of the windows store application. Therefore, the management unit 140 may divide applications using the installation locations of the applications.

A windows store application includes a unique identification (ID) value in addition to a preprogram name, but the desktop application does not include a unique ID value. Therefore, the management unit 140 may determine whether the application is a desktop application or a windows store application based on whether or not a unique ID value is included. The division operation may be performed using one determination criterion or by applying the above-described determination criteria.

In response to the division of each of the plurality of applications through the above-described process, the management unit 140 manages the applications determined to be windows store applications as the modern list. The management unit 140 manages the applications determined to be desktop applications as the desktop list.

In response to a new application being installed, the management unit 140 adds the new application to a corresponding list according to its type. In response to an application being deleted, the management unit 140 deletes the application from a list corresponding to the deleted application.

The virtualization unit 150 performs virtualization in the second operation mode in the first operation mode. Specifically, in response to an operation command operated in the first operation mode being received with respect to the windows store application, the virtualization unit 150 may operate the selected windows store application in the virtualized second operation mode. A setting change generated in the operating process may be stored in a region corresponding to the windows store application. Detailed operation of the virtualization unit 150 is described below with reference to FIGS. 4 and 5. In an embodiment of the present invention, the second operation mode is driven in the first operation mode using virtualization. However, other than the virtualization method, the first operation mode itself may be implemented to support the second operation mode.

The controller 160 performs control for components of the electronic apparatus 100. Specifically, the controller 160 controls the management unit 140 to manage various types of lists in response to the system being booted, or a new application being installed. In response to entering the first operation mode, that is, in response to a wallpaper of the desktop mode being displayed, the controller 160 controls the user interface unit 120 to display an icon corresponding to a windows store application included in the list.

In response to the displayed icon (e.g. icon corresponding to the windows store application) being selected, the controller 160 drives the selected icon. In response to the selection in which the windows store application corresponding to the selected icon operates in the desktop mode being received, the controller 160 performs virtualization in the second operation mode on the first operation mode, and operates a windows store application corresponding to the selected icon in the virtualized second operation mode.

As described above, the electronic apparatus 100 according to an embodiment of the present invention registers a windows store application frequently used by the user on the desktop wallpaper as an icon, and the user may easily drive the windows store application in the desktop mode. Further, the electronic apparatus 100 according to an embodiment of the present invention may drive the windows store application in the desktop mode, and may operate in the same manner as an existing OS method (for example, Windows XP or Windows 7) to increase the user's familiarity of an OS.

FIG. 1 illustrates that the management unit 140, the virtualization unit 150, and the controller 160 are separately configured, but the electronic apparatus 100 may be implemented in such a manner that the functions of the management unit 140, virtualization unit 150, and the controller 160 are configured of one component. An embodiment of the electronic apparatus 100 is described below with reference to FIG. 2.

Figure 2:
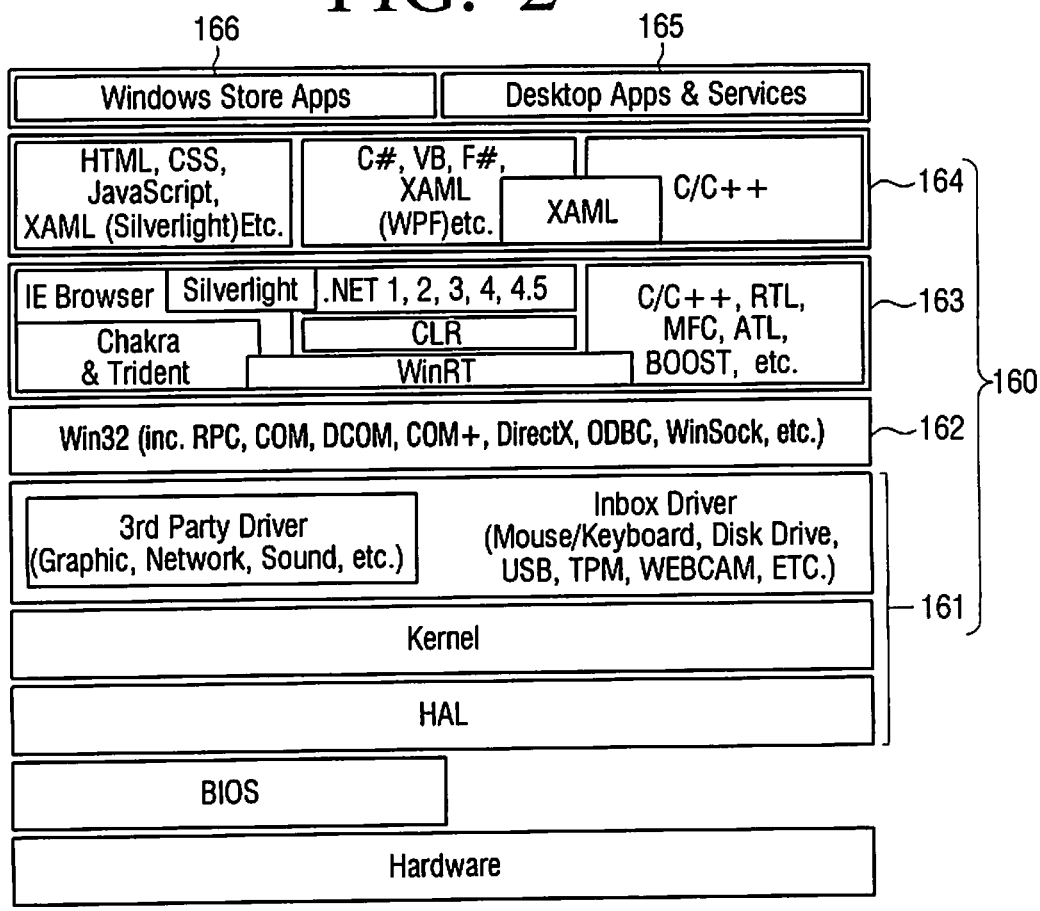
FIGS. 2 and 3 are views illustrating a detailed configuration of a controller of FIG. 1.
Figure 3:
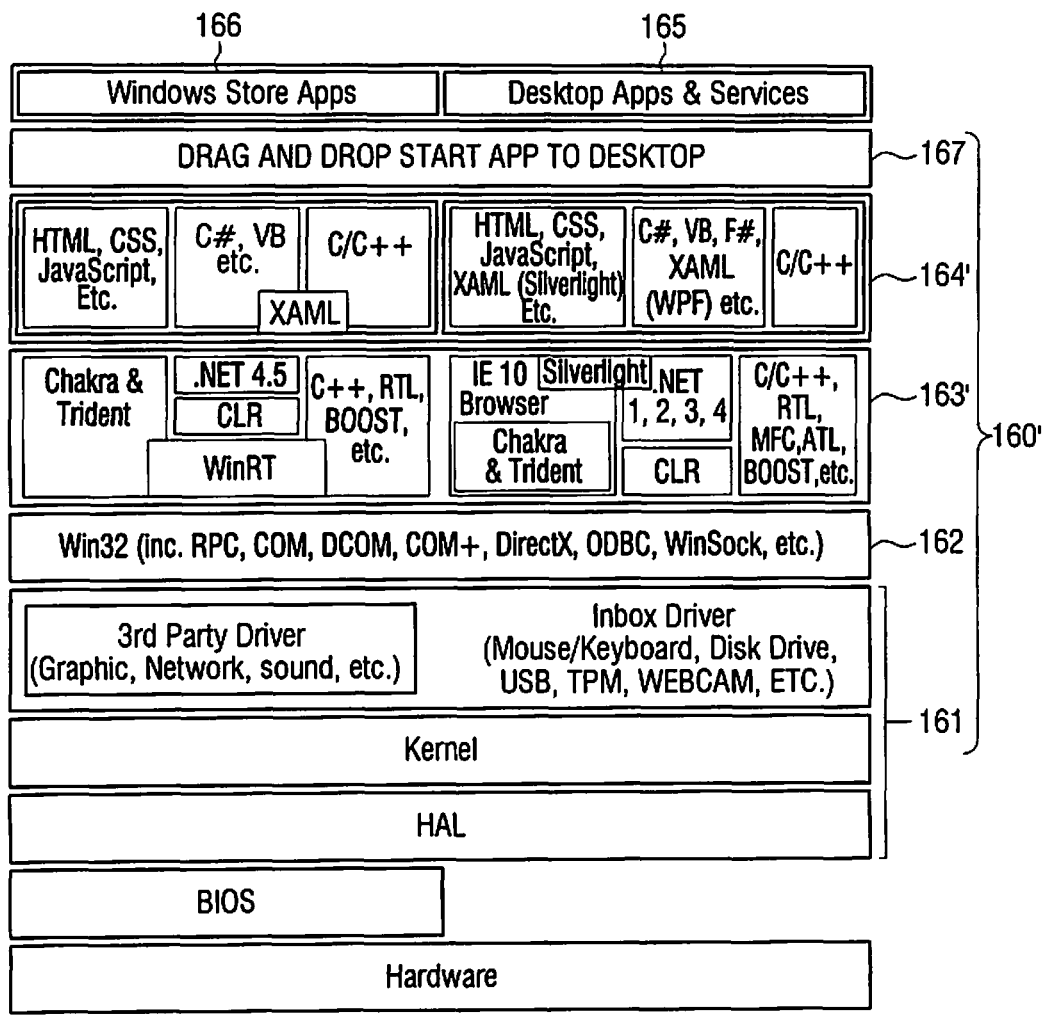

FIGS. 2 and 3 are views illustrating a detailed configuration of the controller 160 of FIG. 1. Specifically, FIGS. 2 and 3 illustrate examples of a structure of a controller 160 which allows a windows store application operating in the second operation mode to be operated in the first operation mode.

Referring to FIG. 2, the controller 160 includes an Operating System (OS) layer 161, an Application Program Interface (API) layer 162, operating language layers 163 and 164, a desktop application layer 165, and a windows store application layer 166.

The OS layer 161 serves as an interface between hardware and an application program, and manages computer resources such as the storage unit 130, or the user interface unit 120. The OS layer 161 may include a mouse driver and a touch input panel driver.

The API layer 162 is a layer configured to assist an interaction between an OS and an operation language, and supports various programs.

The operating language layers 163 and 164 perform an actual operation using a program language corresponding to an application. Each program of the operating language layers 163 and 164 may operate both a desktop application and a windows store application. The operating language in the related art operates only the desktop application or the windows store application. However, the operating language according to the present invention may operate both the desktop application and the windows store application in response to languages that are the same as each other. Therefore, the operating language may perform an operation of the windows store application in the first operation mode.

The desktop application layer 165 and windows store application layer 166 are layers in which an application operating on the OS is operated. The application includes a desktop application and a windows store application as described above.

Referring to FIG. 3, a controller 160' includes an OS layer 161, an API layer 162, operating language layers 163' and 164', a virtualization layer 167, a desktop application layer 165, and a windows store application layer 166.

The OS layer 161 serves as an interface between hardware and an application program, and manages computer resources such as the storage unit 130, or the user interface unit 120. The OS layer 161 may include a mouse driver and a touch input panel driver.

The API layer 162 is a layer configured to assist an interaction between an OS and an operation language, and supports various programs.

The operating language layers 163' and 164' perform an actual operation using a program language corresponding to an application. Specifically, unlike the operating languages of FIG. 2, operating languages in the operating languages layers 163' and 164' may operate only the desktop application or the windows store application. For example, an operating language such as Windows Runtime Library (WinRT) or .NET Framework 4.5 operates only the windows store application, and the operating language such as Internet Explorer (IE) 10 Browser operates only the desktop application.

As described above, the operating languages of the operating language layers 163' and 164' of FIG. 3 operate only one application, and an operating language supporting only a windows store application may not be used in the desktop mode. However, it is inconvenient to not be able to operate a windows store application in the desktop mode as described above. In the present invention, a modern UI is virtualized in the desktop mode using a virtualization method, and the windows store application may be operated on the virtualized modern UI. The virtualization operation is described below with reference to FIGS. 4 and 5.

The desktop application layer 165 and the windows store application layer 166 are layers in which an application operating on the OS is operated. The application includes a desktop application and a windows store application as described above.

Figure 4:
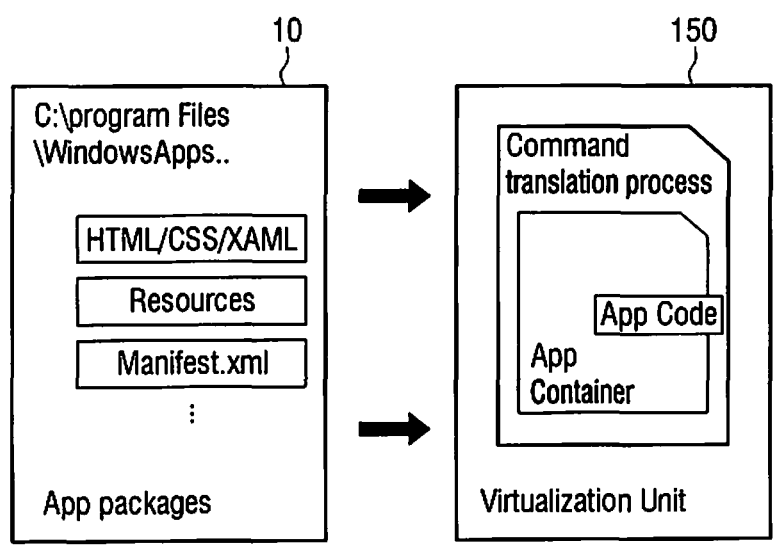
FIGS. 4 and 5 are views of an operation of a virtualization unit of FIG. 1.
Figure 5:
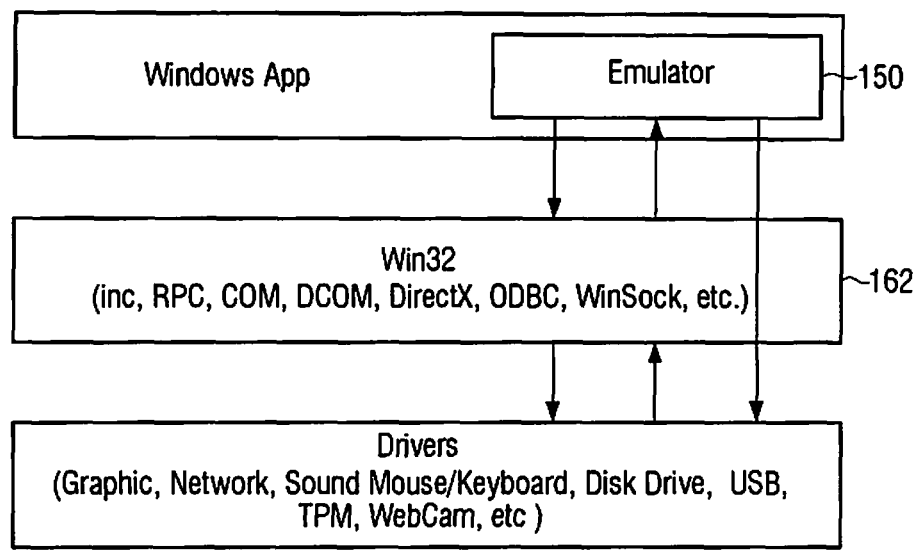

FIGS. 4 and 5 are views of an operation of the virtualization unit 150 of FIG. 1.

Referring to FIG. 4, the virtualization unit 150 is an emulator operating in the first operation mode. The emulator is operated in the desktop mode, and performs in virtualization as if a package code 10 of a windows store application, to which an operation command is input, is operated on the modern UI. The emulator may be an emulator supporting the second operation mode in the first operation mode. The emulator may be an emulator supporting an additional OS. That is, the virtualization unit 150 may perform virtualization with the same OS in the desktop mode, and operate a windows store application on the virtualized OS.

Referring to FIG. 5, a read/write command of an application executed in the virtualization unit 150, which is an emulator, is mapped not with a space of the emulator but with the storage unit 130 of the execution hardware (in response to a write command to a specific region of a Hard Disc Drive (HDD), the emulator may interpret the command and record the command in an actual HDD).

Specifically, in response to a read/write command being sensed, the virtualization unit 150 communicates with hardware using the API 162 supported in the OS, and performs a read/write operation on the hardware. In response to a setting environment of a windows store application operating on the emulator through the above-described operation being changed, the changed setting environment may be stored in a HDD space designated to the windows store application. Thus, even when a corresponding windows store application is being operated in the second operation mode, the environment changed in the emulator may be applied.

FIGS. 6 to 17 are views illustrating various examples of user interface windows to be displayed in the user interface unit 120 of FIG. 1.

Figure 6:
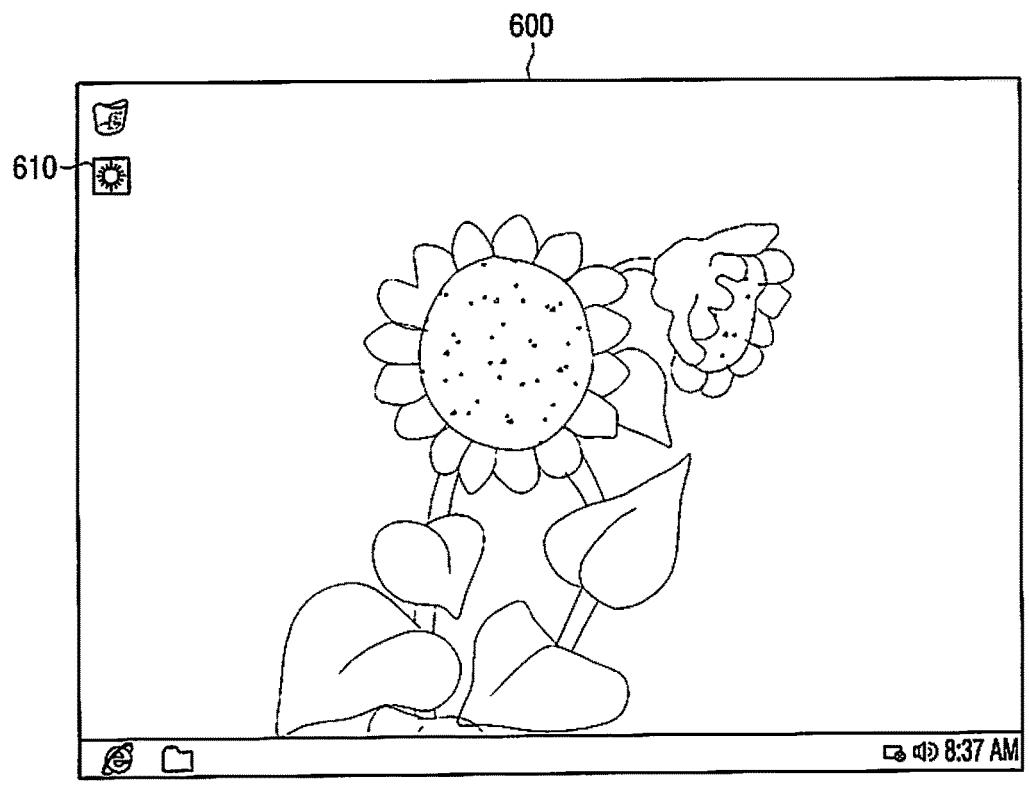
FIGS. 6 to 17 are views illustrating various user interface windows to be displayed in a user interface unit of FIG. 1.

Referring to FIG. 6, a user interface window 600 is a screen displayed in response to entering the first operation mode, and is a wallpaper of the desktop mode. The user interface window 600 includes an icon 610 corresponding to a windows store application included in a list. The example illustrated in FIG. 6 illustrates only an icon 610 of one windows store application, but the wallpaper of the desktop mode may be implemented to include a plurality of icons. The embodiment of the present invention illustrates that only the icon 610 corresponding to the windows store application is displayed, but it is obvious that an icon of a desktop application may be displayed on the wallpaper of the desktop mode.

The user may select an icon displayed in the user interface window 600 to operate a windows store application. Hereinafter, a method of adding an icon to a wallpaper of the desktop mode is described with reference to FIGS. 7 to 10.

Figure 7:
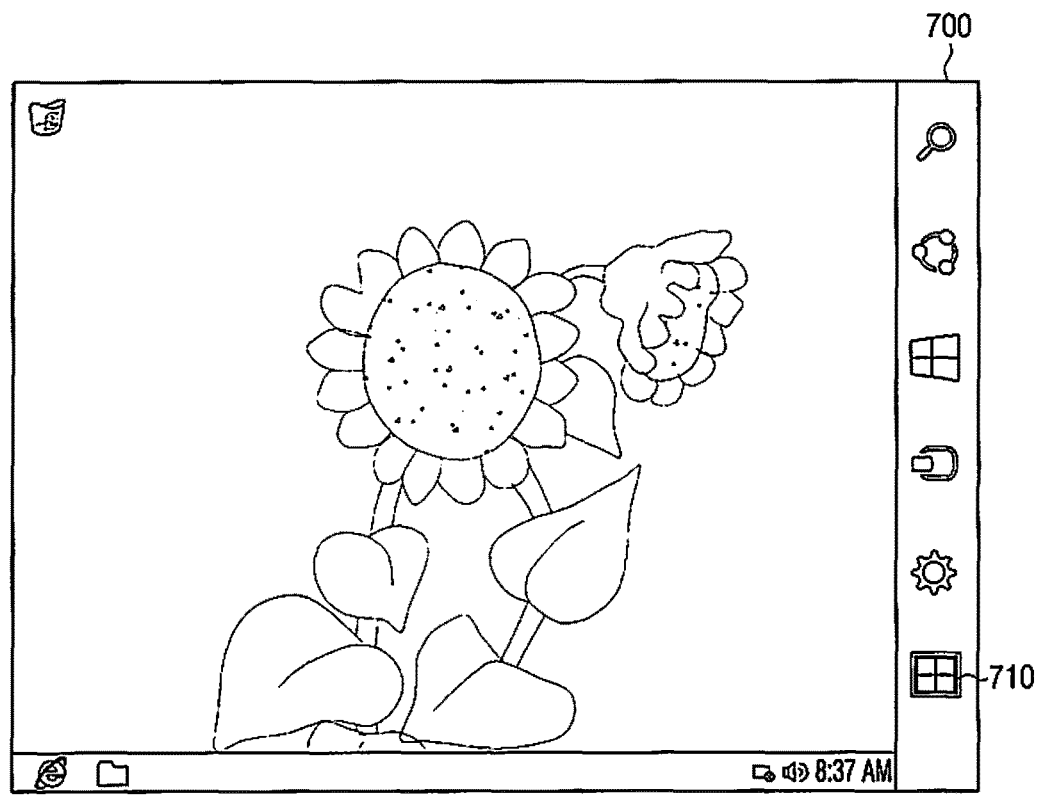

There are various methods of adding an icon to a wallpaper of the first operation mode. Preferably, an icon addition method in a state in which the first operation mode is displayed is described. First, to add an icon, a target to be added must be selected. Therefore, the user may display a charm bar 700 as illustrated in FIG. 7, select an icon 710 indicating an installed application on the displayed charm bar 700, and allow a list of the installed application to be displayed in the electronic apparatus. Accordingly, the electronic apparatus 100 may display a user interface window as illustrated in FIG. 8.

Referring to FIG. 7, the list for the installed application is displayed by selecting the icon on the charm bar 700, but the user interface window may be implemented to display the list of the installed application in response to a preset touch gesture or a shortcut key being selected.

Figure 8:
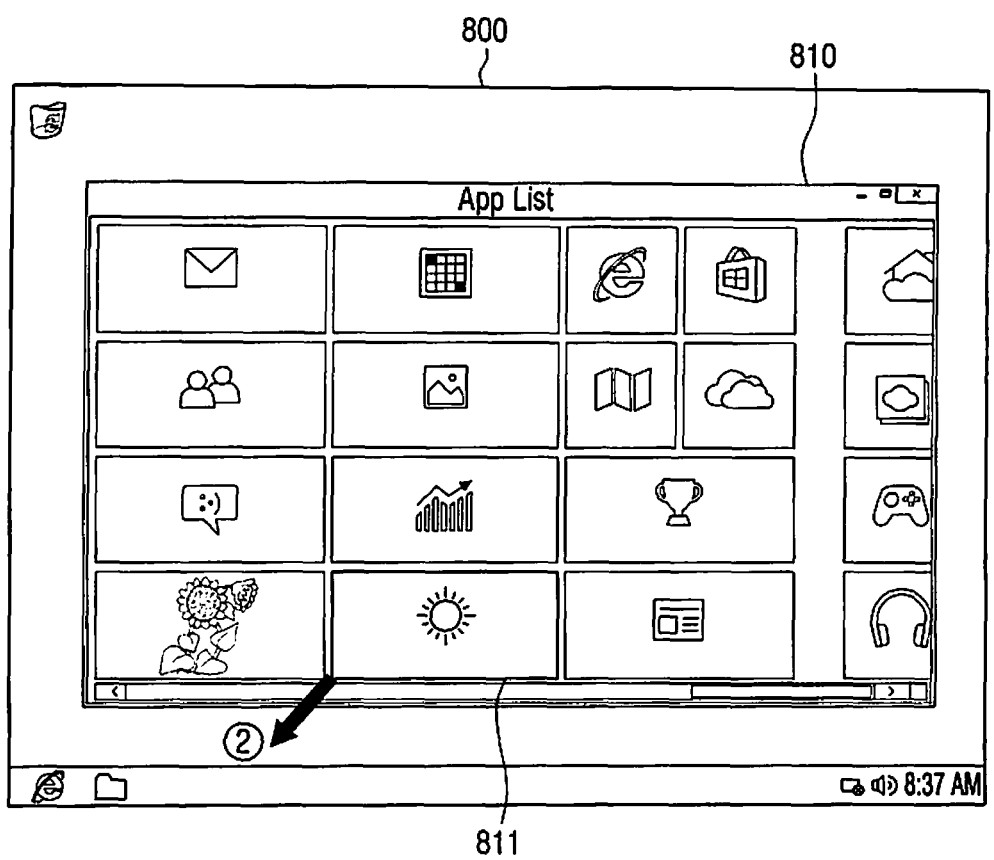

Referring to FIG. 8, a user interface window 800 includes a region 810 which displays installed applications. The region 810 may have the same form as a starting screen (e.g. a starting screen of a modern UI) of the second operation mode. The region may be implemented in a tile form or a list form. The region may not display all the applications installed in the electronic apparatus 100 but only windows store applications. A plurality of applications may be arranged and displayed in the region by considering frequency of use, an installed order, or an application time.

In a state in which the user interface window 800 is displayed, the user may select an application to be added to a wallpaper of the desktop mode, and place the selected application on the wallpaper of the desktop mode in a drag and drop form to add the selected application to the list. FIG. 8 illustrates that the application is added to the list in the drag and drop form, but the user interface window may be implemented in such a manner that the application is added through various methods.

The list addition method has been described in the desktop mode as the first operation mode. Hereinafter, a list addition method in the modern UI as the second operation mode is described with reference to FIGS. 9 and 10.

Figure 9:
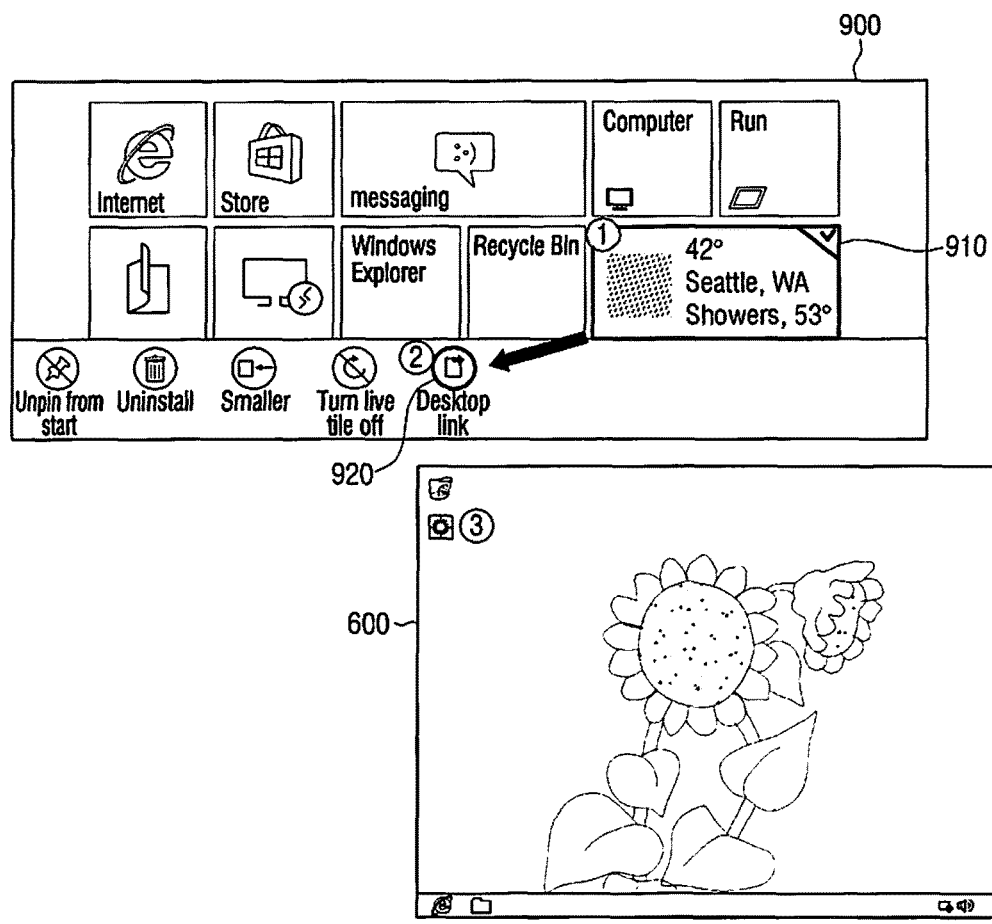

Referring to FIG. 9, a user interface window 900 is a starting screen of the modern UI. The starting screen displays the list of applications installed in the electronic apparatus 100 in a tile form. The user selects one tile 910 among displayed tiles, and places the selected tile 910 on a desktop link icon 920 in a drag and drop form to add the selected application to the list. The desktop link icon 920 is a region which receives a command for adding an icon to the wallpaper of the desktop mode. FIG. 9 illustrates that the corresponding command is received in a drag and drop form, but the command input may be implemented by the operation of selecting an application to be added through a preset action (e.g. selection for a preset time), and selecting a corresponding icon.

Figure 10:
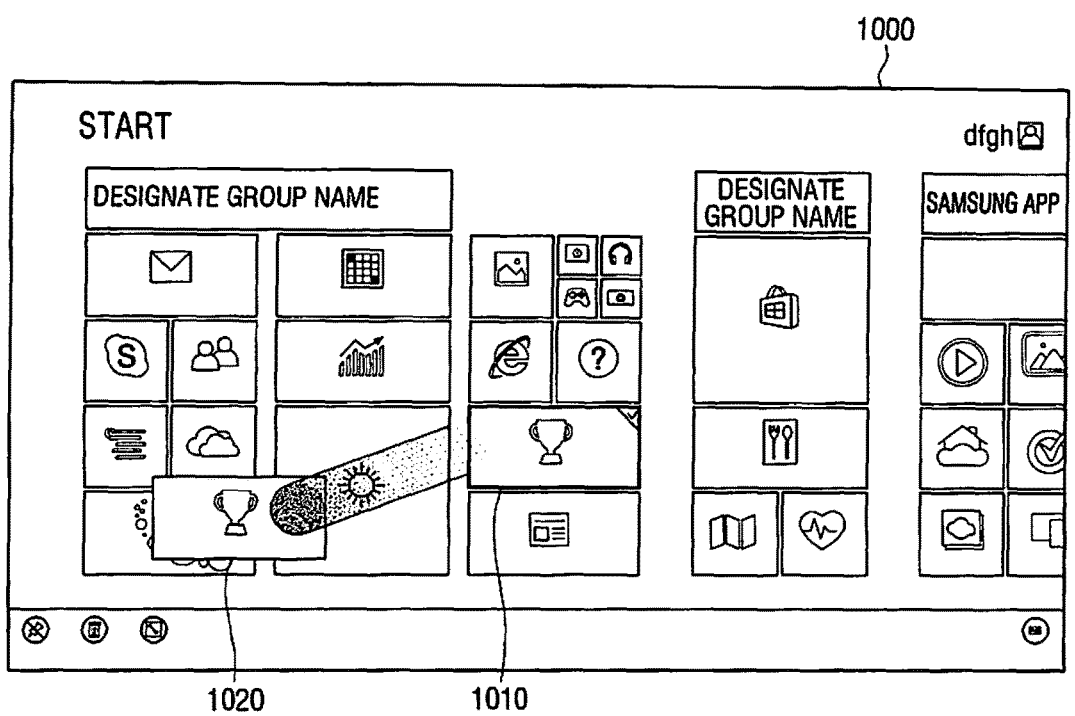

Referring to FIG. 10, a user interface window 1000 is a starting screen of the modern UI. The starting screen displays a list of applications installed in the electronic apparatus 100 in a tile form. The user selects one tile 1010 among displayed tiles, and places the selected tile 1010 in a desktop mode icon 1020 in a drag and drop form to add the selected application to the list. In response to a corresponding icon being selected, the desktop mode icon 1020 receives a command for converting the modern UI into the desktop mode.

Figure 11:
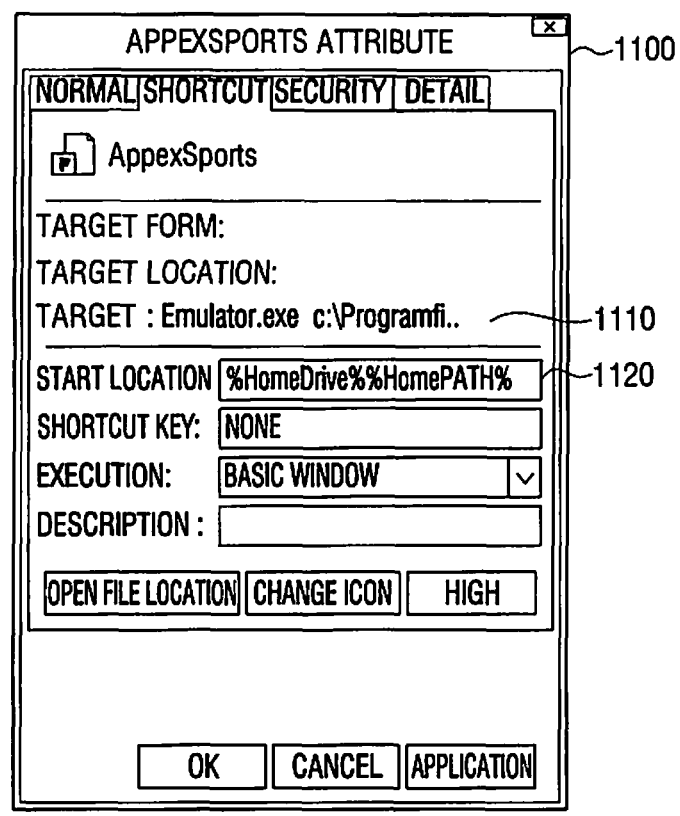

FIG. 11 is a view illustrating a user interface window which displays attribute information of a corresponding icon in response to an icon being added to a wallpaper of the desktop mode through the methods of FIGS. 8 to 10.

A user interface window 1100 displays address information of a corresponding application and information for a display location in operation, or the like of the application. An icon of the application may be changed through the window.

The icon addition method of the windows store application to the wallpaper of the desktop mode is described above. Hereinafter, various embodiments of the present invention which receive a command for operating a windows store application in the desktop mode are described with reference to FIGS. 12 to 15.

Referring to FIG. 6, the user selects an icon installed in a wallpaper of the desktop mode and operates the windows store application 610.

In that the windows store application is generally operated in the modern UI, in response to the icon 610 being selected in an embodiment of the present invention, the electronic apparatus 100 converts the desktop mode into the modern UI, and drives a windows store application corresponding to the icon 610 in the modern UI.

However, as described in the related art, in the response to the windows store application, the environment operating in the desktop mode may be convenient for the user (Specifically, a size of a window in the windows store application may be largely varied, but the size may be changed only in a fixed frame. That is, there is inconvenience in that the windows store application may not be displayed with a free size in an arbitrary location like the prior window). The user may want the windows store application to operate in the desktop mode.

Hereinafter, various command methods which allow the windows store application to be operated in the desktop mode are described below.

Figure 12:
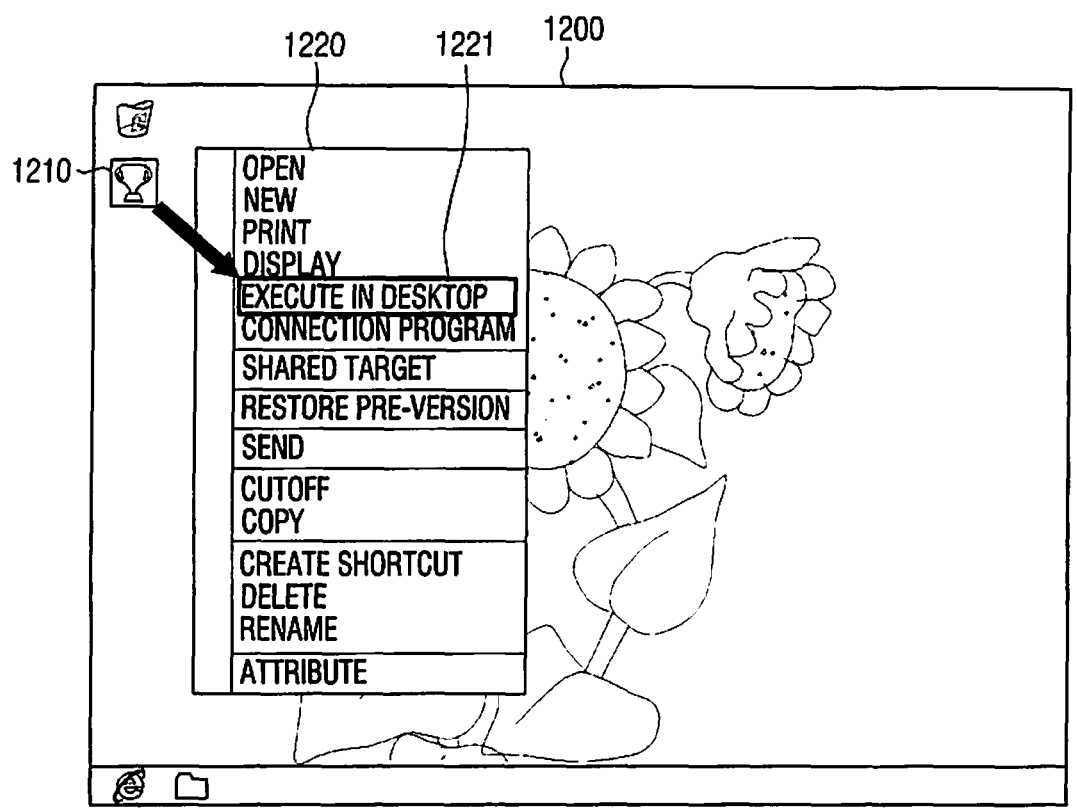

Referring to FIG. 12, a user interface window 1200 displays a wallpaper of the desktop mode, and the wallpaper includes an icon 1210 for a windows store application.

In response to the icon 1210 not being directly selected by the user but being selected to display a menu display window (for example, in response to the icon being selected for a preset time), a menu display window 1220 including various options for the icon is displayed.

Therefore, the user may select "execute in desktop" in the displayed menu display window 1220, and input a command for allowing a windows store application corresponding to a corresponding icon to be operated in the desktop mode.

FIGS. 6 to 12 illustrate that in response to an icon being double clicked, the windows store application is operated in the modern UI, and the windows store application is operated in the desktop mode in response to "execute in desktop" being selected after a right button of a mouse (or an icon for a preset time) is selected. However, the electronic apparatus may be conversely implemented. That is, in response to an icon on a wallpaper of the desktop mode being selected, the windows store application is operated in the desktop mode, and the windows store application is operated in the modern UI in response to "execute to modern UI" being selected after a right button of the mouse (or an icon for a preset time) is selected.

Figure 13:
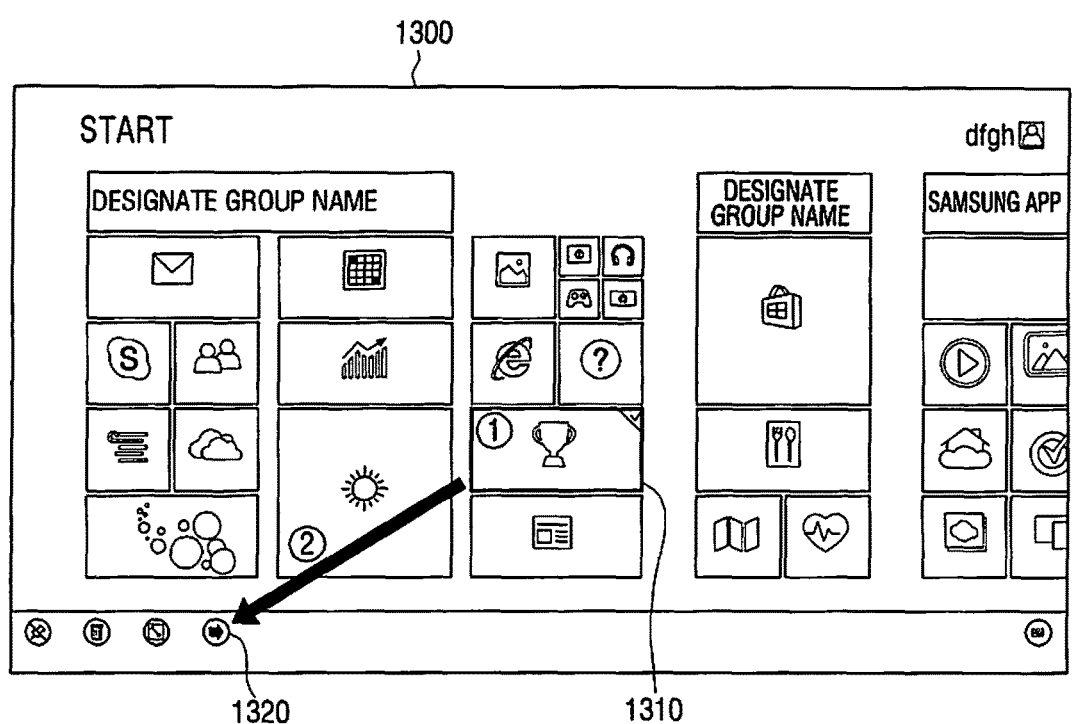

Referring to FIG. 13, a user interface window 1300 is a starting screen of the modern UI. The starting screen displays a list of applications installed in the electronic apparatus 100 in a tile form. The user selects one tile 1310 among displayed tiles, and places the selected tile 1310 on an operation icon 1320 in the desktop mode in a drag and drop form to input an operation command for the selected windows store application in the first operation mode. The operation icon 1320 in the desktop mode is a region which receives a command for operating an application corresponding to the icon in the first operation mode. FIG. 13 illustrates that the corresponding command is received in a drag and drop form, but the command input may be implemented by the operation of selecting an application to be added through a preset action (e.g. selection for a preset time), and selecting a corresponding icon.

Figure 14:
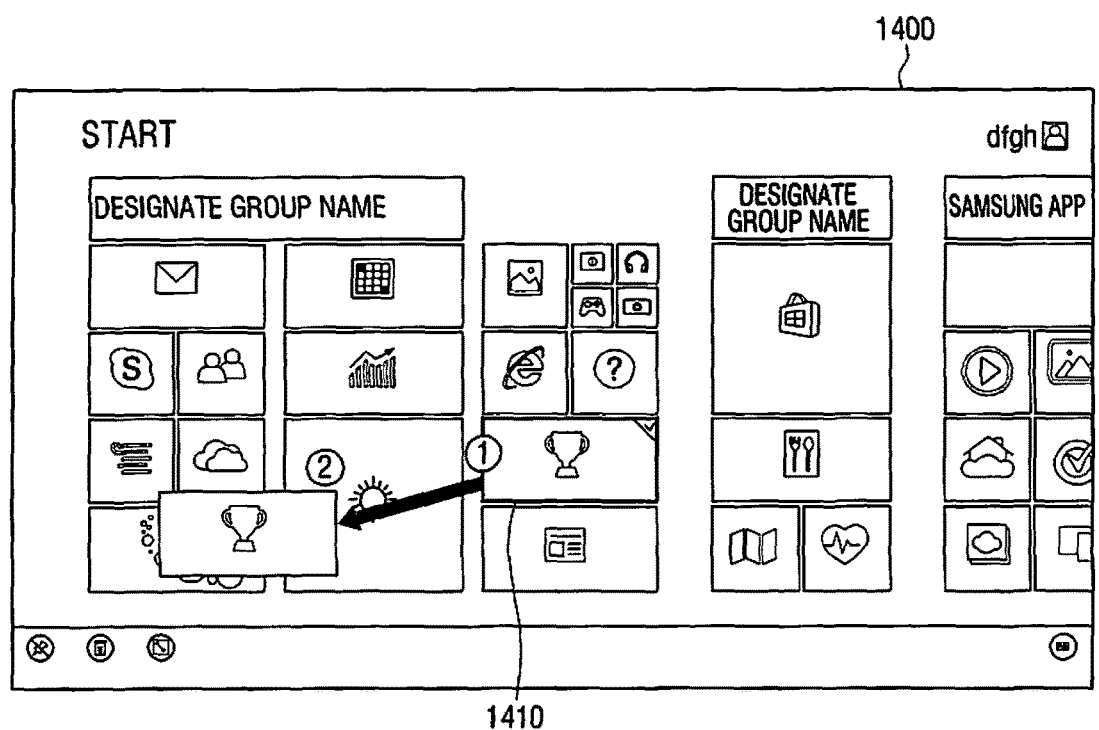

Referring to FIG. 14, a user interface window 1400 is a starting screen of the modern UI. The starting screen displays a list of applications installed in the electronic apparatus 100 in a tile form. The user selects one tile 1410 among displayed tiles, and places the selected tile 1410 on a desktop mode icon 1420 in a drag and drop form to input an operation command for the selected windows store application in the first operation mode. The desktop mode icon 1420 is an icon which receives a command for converting the modern UI into the desktop mode in response to the corresponding icon being selected.

The method of selecting an operation environment in an initial operation with respect to the application is described, but the method of changing an operation environment with an application which is operating may be implemented.

Figure 15:
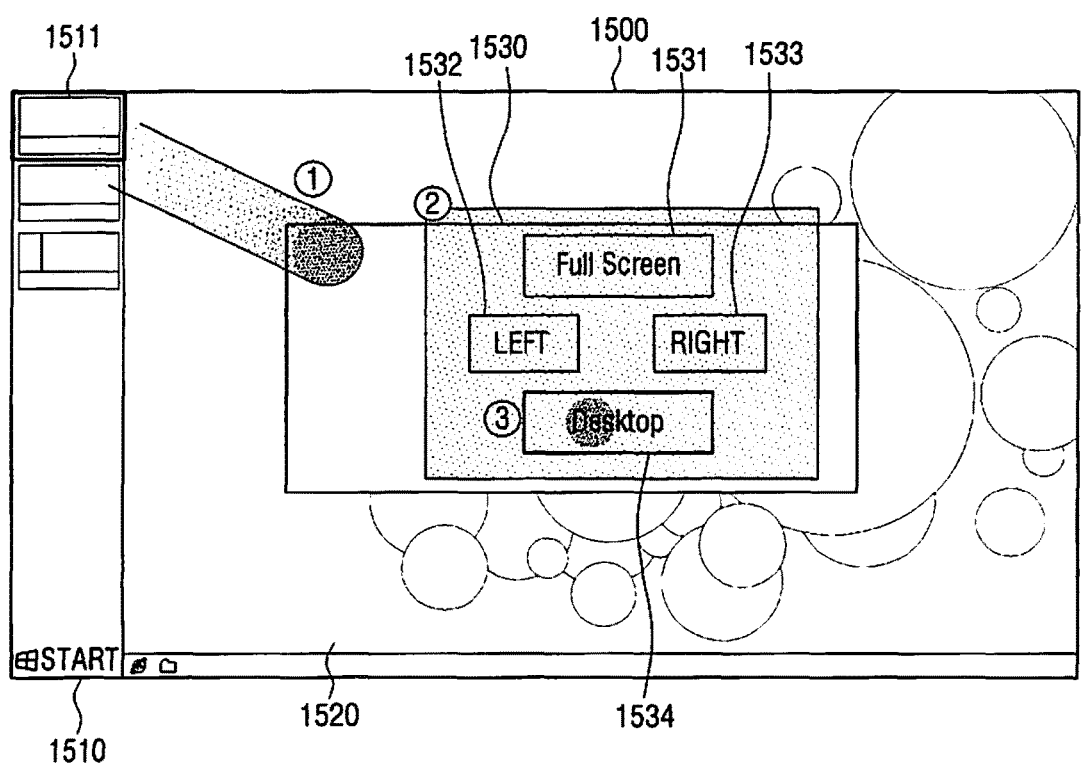

Referring to FIG. 15, the user interface window 1500 includes an operation list region 1510, and a desktop mode region 1520.

The operation list region 1510 is a region which displays a list of applications which are currently operating in the electronic apparatus 100.

In response to a windows store application 1511, which is operating, displayed in the operation list region 1510 being selected and dragged and dropped to the desktop mode region 1520 by the user, a window 1530 for checking movement intent of the user is displayed.

The displayed window 1530 includes a full screen region 1531, a left region 1532, a right region 1533, and a desktop region 1534.

The full screen region 1531 is a region which is selected to display a screen of a windows store application selected by the user in a full screen.

The left region 1532 is a region which is selected to display a screen divided into a left region and a right region, and to display a screen of the application selected by the user in the left region.

The right region 1533 is a region which is selected to display a screen divided into a left region and a right region, and to display a screen of the application selected by the user in the right region.

The desktop region 1534 is a region which receives a command for operating the screen of the application selected by the user in the desktop mode. In response to the desktop region being selected, a screen as illustrated in FIG. 16 is displayed.

Figure 16:
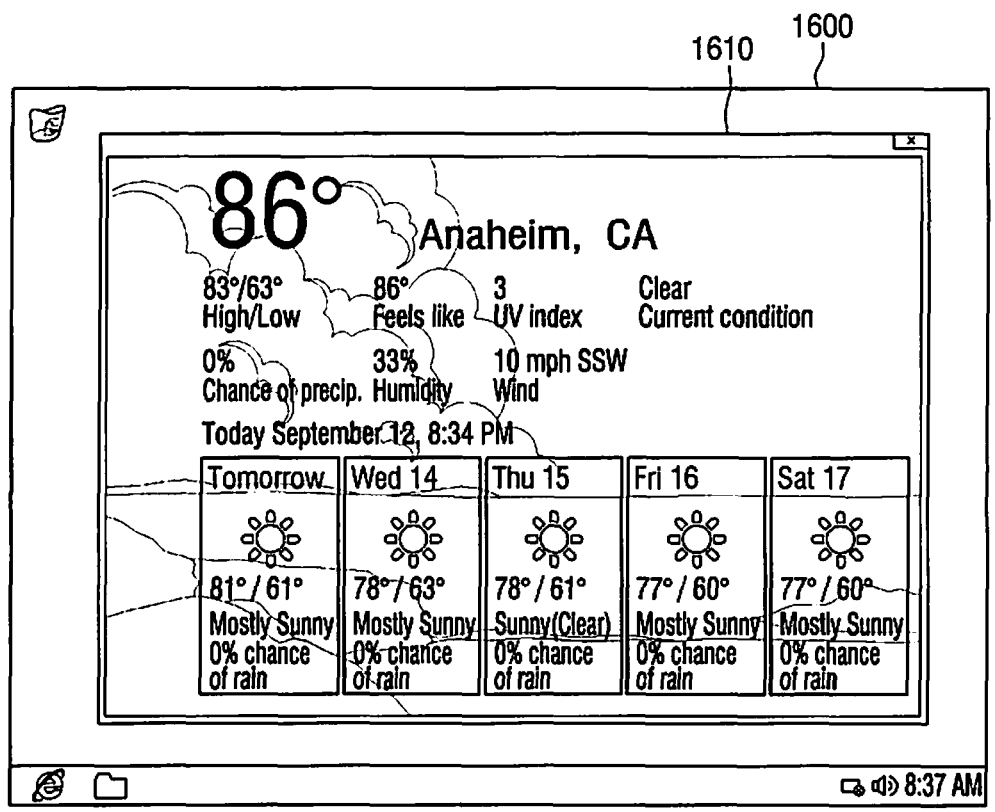

Referring to FIG. 16, a user interface window 1600 displays a screen in the desktop mode, and a screen corresponding to a windows store application is displayed in a form of a widget window 1610.

As described above, the electronic apparatus according to the exemplary embodiment displays a windows store application in a desktop mode in a window form.

Figure 17:
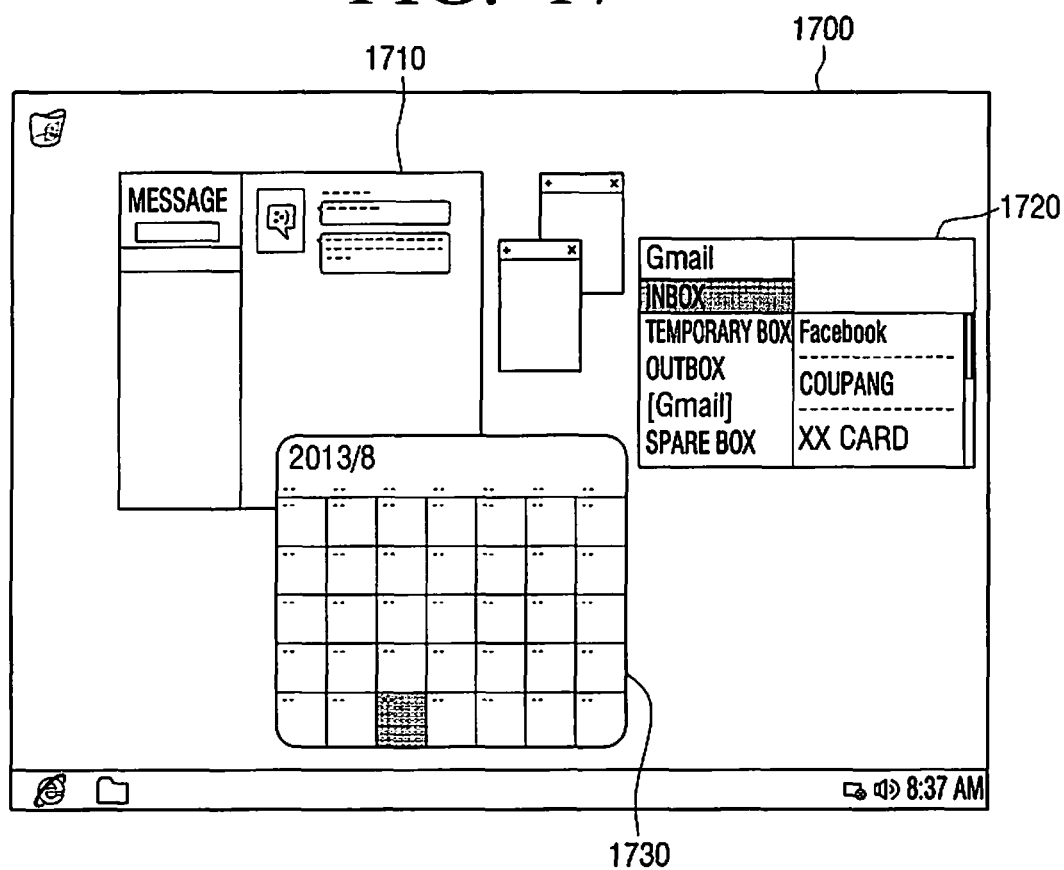

FIG. 16 illustrates that one window is displayed in the desktop mode, but a plurality of windows may be implemented to be displayed as illustrated in FIG. 17.

Figure 18:
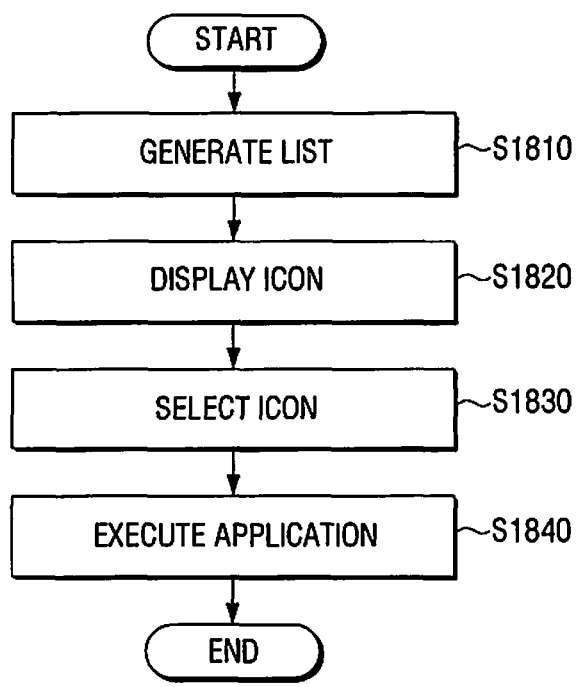
FIG. 18 is a flowchart illustrating an application execution method according to an embodiment of the present invention.

FIG. 18 is a flowchart illustrating an application execution method according to an embodiment of the present invention.

Referring to FIG. 18, first, the electronic apparatus manages a list for a windows store application to be displayed in response to entering the first operation mode among a plurality of pre-stored applications in step S1810. Specifically, the electronic apparatus determines whether each of the plurality of applications previously stored (or previously installed) is a desktop application or a windows store application, and manages a list for an application previously selected by the user among applications determined to be windows store applications. The list may include address information for an execution file of the windows store application and icon information for the windows store application. The management includes generation of a first list and correction of the list corresponding to addition and deletion of an application after the generation of the list. The correction of the list was described above, and is omitted here.

In response to entering the first operation mode, the electronic apparatus displays an icon corresponding to the windows store application included in the list in step S1820. Specifically, in response to entering a state in which a wallpaper of the desktop mode must be displayed, the electronic apparatus displays an icon corresponding to the windows store application in the previously generated. The displayed icon is the same as the icon displayed on the modern UI or has a different shape from the icon displayed on the modern UI.

In response to the displayed icon being selected in step S1830, the electronic apparatus operates the windows store application corresponding to the selected icon in step S1840. Specifically, the electronic apparatus operates the windows store application corresponding to the selected icon in the second operation mode or generates a virtualization environment to operate the second operation mode in the first operation mode, and operates the windows store application in the first operation mode. The virtualization operation is described above, and is omitted here.

As described above, the application execution method according to the present invention registers a windows store application frequently used by the user on the desktop wallpaper as an icon, and the user may easily drive the windows store application in the desktop mode. Further, the application execution method according to the present invention drives the windows store application in the desktop mode, and operates the windows store application in the same manner as an existing OS method (for example, Windows XP or Windows 7) to increase a user's familiarity of the OS. The application execution method as illustrated in FIG. 18 may be executed on the electronic apparatus of FIG. 1, or on other electronic apparatuses.

The application execution method according to the exemplary embodiment may be implemented with a program (or an application) including a computer-executable algorithm, and the program may be stored in a non-transitory computer-readable recording medium, and provided.

The non-transitory computer-readable recording medium is not a medium configured to temporarily store data such as a register, a cache, or a memory but an apparatus-readable recording medium configured to semi-permanently store data. Specifically, the above-described various applications or programs may be stored in the non-transitory apparatus-readable recording medium, such as a Compact Disc (CD), a Digital Versatile Disc (DVD), a hard disc, a Blu-ray disc, a Universal Serial Bus (USB), a memory card, or a Read Only Memory (ROM), and provided.

The foregoing embodiments of the present invention and advantages are merely examples and are not to be construed as limiting the present invention. The embodiments can be readily applied to other types of devices. Also, the description of the embodiments is intended to be illustrative, and not to limit the scope of the claims, and many alternatives, modifications, and variations will be apparent to those skilled in the art.

What is claimed is:

1. A portable electronic device comprising:
a display;
memory to store a first set of applications and a second set of applications, the first set of applications and the second set of applications to be executed in a first operation mode and a second operation mode of a same operating system, respectively; and
a processor adapted to:
display a background screen and a first icon on the display, at least temporarily, while the portable electronic device is operated in the first operation mode,
identify a first input received with respect to the first icon,
display a first rectangular indication and a second rectangular indication on a first portion of the background screen based at least in part on the first input, the first rectangular indication indicative of a first application of the first set of applications and the second rectangular indication indicative of a second application of the second set of applications, wherein the second rectangular indication is displayed as corresponding to the second operation mode,
identify a dragging input received with respect to the second rectangular indication selected from the first and second rectangular indications,
display, in response to the dragging input being released, a second icon corresponding to the second application of the second set of applications indicated by the selected second rectangular indication on a second portion of the background screen where the dragging input is released, wherein the second icon is displayed as corresponding to the first operation mode, and
execute the second application of the second set of applications based at least in part on a second input received with respect to the second icon.

2. The portable electronic device of claim 1, further comprising a communication interface,
wherein the processor is further adapted to receive, using the communication interface, the second set of applications from an external electronic device via a communication network, the external electronic device adapted to provide an application store service to a plurality of electronic devices including the portable electronic device with respect to the second set of applications.

3. The portable electronic device of claim 1, wherein the processor is further adapted to display the first and second rectangular indications on the first portion of the background screen in a grid pattern.

4. The portable electronic device of claim 1, wherein the processor is further adapted to maintain the first operation mode while the second application is executed.

5. The portable electronic device of claim 1, wherein the processor is further adapted to display a first user interface corresponding to the second application on a portion of the background screen while the second application is executed in the first operation mode, the first user interface including a close button to terminate execution of the second application.

6. The portable electronic device of claim 1, wherein the processor is further adapted to:
transition into the second operation mode in response to the second input, and
maintain the second operation mode while the second application is executed.

7. A portable electronic device comprising:
a display;
memory to store a first set of applications and a second set of applications, the first set of applications and the second set of applications to be executed in a first operation mode and a second operation mode of a same operating system, respectively; and
a processor adapted to:
display a background screen and a first icon on the display, at least temporarily, while the portable electronic device is operated in the first operation mode,
identify a first input received with respect to the first icon,
display an application list including a plurality of tile icons on a first portion of the background screen based at least in part on the first input, the plurality of tile icons including a first tile icon indicative of a first application of a first set of applications and a second tile icon indicative of a second application of the second set of applications,
identify a dragging input received with respect to the second tile icon selected from the first and second tile icons,
display, in response to the dragging input being released, a second icon corresponding to the second application of the second set of applications indicated by the selected second tile icon on a second portion of the background screen, the second icon having a size smaller than the size of the second tile icon, and
execute the second application of the second set of applications based at least in part on a second input received with respect to the second icon.

8. The portable electronic device of claim 7, wherein the processor is further adapted to store the first set of applications in a first region of the memory, and the second set of applications in a second region of the memory.

9. The portable electronic device of claim 7, wherein the processor is further adapted to identify the second application as distinguished from the first set of applications based at least in part on a determination that a specified application identifier is assigned to the second application.

10. The portable electronic device of claim 7, wherein the processor is further adapted to maintain the first operation mode while the second application is executed.

11. The portable electronic device of claim 7, wherein the processor is further adapted to display a first user interface corresponding to the second application on a portion of the background screen while the second application is executed in the first operation mode.

12. The portable electronic device of claim 11, wherein the processor is further adapted to display, in the first user interface, a close button to terminate the executing of the second application.

13. The portable electronic device of claim 11, wherein the processor is further adapted to change a size of the first user interface in response to a third input.

14. A non-transitory, machine-readable, storage device storing instructions thereon that, when executed by one or more processors, cause the one or more processors to perform operations comprising:
storing, at a portable electronic device, a first set of applications and a second set of applications, the first set of applications and the second set of applications to be executed in a first operation mode and a second operation mode of a same operating system, respectively;
displaying, on a display operatively coupled with the portable electronic device, a background screen and a first icon at least temporarily while the portable electronic device is operated in the first operation mode;
identifying a first input received with respect to the first icon;
displaying a first rectangular indication and a second rectangular indication on a first portion of the background screen based at least in part on the first input, the first rectangular indication indicative of a first application of the first set of applications and the second rectangular indication indicative of a second application of the second set of applications, wherein the second rectangular indication is displayed as corresponding to the second operation mode;
identifying a dragging input received with respect to the second rectangular indication selected from the first and second rectangular indications;
displaying, in response to the dragging input being released, a second icon corresponding to the second application of the second set of applications indicated by the selected second rectangular indication on a second portion of the background screen, wherein the second icon is displayed as corresponding to the first operation mode; and
executing the second application of the second set of applications based at least in part on a second input received with respect to the second icon.

15. The non-transitory machine-readable storage device of claim 14, wherein the operations further comprise displaying a first user interface corresponding to the second application on a portion of the background screen while the second application is executed in the first operation mode, the first user interface including a close button to terminate execution of the second application.

16. The portable electronic device of claim 1, wherein the processor is further adapted to arrange the first and second rectangular indications according to one or more specified groups as at least part of the displaying of the first and second rectangular indications.

17. The portable electronic device of claim 7, wherein the processor is further adapted to display the plurality of tile icons including the first and second tile icons with division of one or more specified groups as at least part of the displaying of the application list.

18. The portable electronic device of claim 1, wherein the processor is adapted to:
perform the displaying of the second rectangular indication such that the second rectangular indication has a first graphical characteristic corresponding to the second operation mode; and
perform the displaying of the second icon such that the second icon has a second graphical characteristic corresponding to the first operation mode.

19. The portable electronic device of claim 7, wherein the processor is adapted to:
perform the displaying of the second tile icon such that the second tile icon has a first graphical characteristic corresponding to the second operation mode; and
perform the displaying of the second icon such that the second icon has a second graphical characteristic corresponding to the first operation mode.

20. The non-transitory machine-readable storage device of claim 14, wherein the displaying of the second icon is to be performed such that the second icon has a size smaller than the size of the second rectangular indication.

* * * * *